(12) United States Patent
Conti

(10) Patent No.: US 6,791,331 B2
(45) Date of Patent: Sep. 14, 2004

(54) METHOD AND APPARATUS FOR MEASURING CHARACTERISTICS OF GEOLOGICAL FORMATIONS

(75) Inventor: Ugo Conti, El Cerrito, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/753,294

(22) Filed: Jan. 8, 2004

(65) Prior Publication Data

US 2004/0140811 A1 Jul. 22, 2004

Related U.S. Application Data

(62) Division of application No. 09/879,252, filed on Jun. 12, 2001, now Pat. No. 6,703,838, which is a continuation-in-part of application No. 09/610,573, filed on Jul. 5, 2000, now abandoned, which is a division of application No. 09/290,156, filed on Apr. 12, 1999, now abandoned.
(60) Provisional application No. 60/081,653, filed on Apr. 13, 1998.

(51) Int. Cl.[7] .............................. G01V 3/08; G01V 3/26; G01V 3/28
(52) U.S. Cl. ........................................ 324/339; 324/346
(58) Field of Search .................................. 324/338–339, 324/345–346, 368, 372; 175/40, 45; 166/65.1, 66.5

(56) References Cited

U.S. PATENT DOCUMENTS

| | | | |
|---|---|---|---|
| 4,748,415 A | 5/1988 | Vail, III | 324/339 |
| 4,901,023 A | 2/1990 | Vail, III | 324/339 |
| 4,903,207 A | 2/1990 | Alger et al. | 364/422 |
| 5,018,590 A | 5/1991 | Weldon | 175/105 |
| 5,038,107 A | 8/1991 | Gianzero et al. | 324/339 |
| 5,065,100 A | 11/1991 | Vail, III | 324/339 |
| 5,130,655 A | 7/1992 | Conti | 324/258 |
| 5,157,392 A | 10/1992 | Zimmer | 340/853.9 |
| 5,260,661 A | 11/1993 | Vail, III | 324/339 |
| 5,283,520 A | 2/1994 | Martin et al. | 324/220 |
| 5,426,367 A | 6/1995 | Martin et al. | 324/339 |
| 5,586,082 A | 12/1996 | Anderson et al. | 367/73 |
| 5,621,169 A | 4/1997 | Harris et al. | 73/152.18 |
| 5,646,533 A | 7/1997 | Locatelli et al. | 324/339 |
| 5,654,639 A | 8/1997 | Locatelli et al. | 324/339 |

OTHER PUBLICATIONS

Uchida, T. et al, "Effect of a steel casing on crosshole EM measurements," *SEG Annual Meeting*, Expanded Abstract, Houston, Texas, 1991.

Wilt, M. et al, "Crosshole electromagnetic tomography: A new technology for oil field characterization," *The Leading Edge*, 1995, pp. 173–177.

(List continued on next page.)

*Primary Examiner*—Bot LeDynh
(74) *Attorney, Agent, or Firm*—Kevin P. McEnaney; Brigitte L. Echols; John Ryberg

(57) ABSTRACT

An electromagnetic tomography system for determining properties of geological formation penetrated by at least one borehole lined with a conductive tubular includes a transmitter disposed in a first borehole and adapted to induce a magnetic field, a first receiver disposed in the first borehole and adapted to detect a magnetic field induced in the conductive tubular by the transmitter, and a second receiver adapted to detect a magnetic field induced in the geological formation by the transmitter. A method for determining a conductive tubular correction constant includes generating a magnetic field inside a representative piece of the conductive tubular, determining a first magnetic field amplitude inside the representative piece of the conductive tubular at a location proximate to a position of the generating a magnetic field, determining a second magnetic field amplitude outside the representative piece of the conductive tubular, and deriving the conductive tubular correction constant from a ratio of the first magnetic field amplitude and the second magnetic field amplitude.

14 Claims, 4 Drawing Sheets

OTHER PUBLICATIONS

Wilt, M.J. et al. "Crosswell electromagnetic tomography: System design consideration and field results," *Geophysics*, vol. 60, Bi, 3m 1995.

Wilt, Michael et al., "Electromagnetic methods for development and production: State of the art," *The Leading Edge*, pp. 487–490 (Apr. 1998).

Wu, Xu et al, "Influence of steel casings on electromagnetic signals," *Geophysics*, vol. 59, No. 3, 1994.

Augustin, A.M. et al, "A theoretical study of surface-to-borehole electromagnetic logging in cased holes," *Geophysics*, vol. 54, No. 1, 1989.

Nekut, Crosswell Electromagnetic Tomography in Steel-Cased Wells, May–Jun. 1995, Geophysics, vol. 60, No. 3, pp. 912–920.

METHOD AND APPARATUS FOR MEASURING CHARACTERISTICS OF GEOLOGICAL FORMATIONS

CROSS REFERENCE TO RELATED APPLICATIONS

This application is a division of Ser. No. 09/879,252 filed on Jun. 12, 2001 now U.S. Pat. No. 6,703,838, which is a Continuation-in-Part of U.S application Ser. No. 09/610,573 filed on Jul. 5, 2000 now abandoned, which is a division of U.S. application Ser. No. 09/290,156 filed on Apr. 12, 1999 now abandoned, which claimed priority of provisional U.S. Application Serial No. 60/081,653, filed on Apr. 13, 1998 and entitled "ELECTROMAGNETIC INDUCTION METHOD AND APPARATUS FOR THE MEASUREMENT OF THE ELECTRICAL RESISTIVITY OF ROCK FORMATIONS BETWEEN DRILL HOLES CASED WITH STEEL".

FIELD OF THE INVENTION

The present invention relates to well logging using electromagnetic measurements. More particularly, the invention relates to determining subsurface formation properties using electromagnetic induction tomography in a borehole lined with a conductive tubular or casing.

BACKGROUND OF THE INVENTION

Geological formations forming a reservoir for the accumulation of hydrocarbons in the subsurface of the earth contain a network of interconnected paths in which fluids are disposed that may ingress or egress from the reservoir. To determine the behavior of the fluids in the aforementioned network, knowledge of both the porosity and permeability of the geological formations is desired. From this information, efficient development and management of hydrocarbon reservoirs may be achieved. For example, the resistivity of geological formations is a function of both porosity and permeability. Considering that hydrocarbons are electrically insulative and most water contains salts, which are highly conductive, resistivity measurements are a valuable tool to determine the presence of hydrocarbon reservoir in geological formations.

To that end, there have been many prior art attempts to model geological formations. In two articles, "Crosshole Electromagnetic Tomography: A New Technology for Oil Field Characterization," The Leading Edge, March 1995, by Wilt et al. and "Crosshole Electromagnetic Tomography: System Design Considerations and Field Results," Society of Exploration Geophysics, Vol. 60, No. 3 1995, by Wilt et al., measurement of geological formation resistivity is described employing a low frequency electromagnetic system.

FIG. 1 shows typical equipment used in the measurement of geological formation 10 resistivity between two drill holes 12a and 12b using electromagnetic induction. A transmitter T is located in one borehole, while a receiver R is placed in another borehole. The transmitter T typically consists of a coil (not shown) having a multi-turn loop (which consists of $N_T$ turns of wire) wrapped around a magnetically permeable core (mu-metal or ferrite) with a cross section, $A_T$. The transmitter T may further comprise a capacitor (not shown) for tuning the frequency of the coil. When an alternating current, $I_T$, at a frequency of $f_0$ Hz passes through this multi-turn loop, a time varying magnetic moment, $M_T$, is produced in the transmitter. This magnetic moment is defined as follows:

$$M_T = N_T I_T A_T \quad (1)$$

The magnetic moment $M_T$ can be detected by the receiver R as a magnetic field, $B_0$. The transmitter T, receiver R, or both are typically disposed in boreholes (e.g., 12a and 12b) in the earth formation 10. In this case, the detected magnetic field, $B_0$, is proportional to the magnetic moment of the transmitter, $M_T$, and to a geological factor, $k_1$, as follows:

$$B_0 = k_1 M_T \quad (2)$$

The geological factor, $k_1$, is a function of the spatial location and orientation of a field component of the magnetic field, $B_0$, with respect to the magnetic moment of the transmitter, $M_T$.

The receiver R typically includes one or more antennas (not shown). Each antenna includes a multi-turn loop of wire wound around a core of magnetically permeable metal or ferrite. The changing magnetic field sensed by the receiver R creates an induced voltage in the receiver coil (not shown). This induced voltage ($V_R$) is a function of the detected magnetic field ($B_R$), the frequency ($f_0$), the number of turns ($N_R$) of wire in the receiver coil, the effective cross-sectional area of the coil ($A_R$), and the effective permeability ($\rho_R$) of the coil. Thus, $V_R$ can be defined as follows:

$$V_R = \pi f_0 B_R N_R A_R \rho_R \quad (3)$$

While $f_0$ and $N_R$ are known, the product, $A_R \rho_R$, is difficult to calculate. In practice, these constants may be grouped together as $k_R$ and equation (3) may be simplified as:

$$V_R = k_R B_R \quad (4)$$

where $k_R = \pi f_0 N_R A_R \rho_R$. Thus, instead of determining the product $A_R \rho_R$, it is more convenient to determine $k_R$ according to the following procedures. First, the receiver coil is calibrated in a known field, at a known frequency. Then, the exact value for $k_R$ is derived from the magnetic field ($B_R$) and the measured voltage ($V_R$) according to the following equation:

$$k_R = B_R / V_R \quad (5)$$

When this system is placed in a conducting geological formation, the time-varying magnetic field, $B_0$, which is produced by the transmitter magnetic moment, produces a voltage in the geological formation, which in turn drives a current therein, $L_1$. The current, $L_1$, is proportional to the conductivity of the geological formation and is generally concentric about the longitudinal axis of the borehole. The magnetic field proximate to the borehole results from a free space field, called the primary magnetic field, while the field resulting from current $L_1$ is called the secondary magnetic field.

The current, $L_1$, is typically out of phase with respect to the transmitter current, $I_T$. At very low frequencies, where the inductive reactance is small, the current, $L_1$, is proportional to dB/dt and is 90° out of phase with respect to $I_T$. As the frequency increases, the inductive reactance increases and the phase of the induced current, $L_1$, increases to be greater than 90°. The secondary magnetic field induced by current $L_1$ also has a phase shift relative to the induced current $L_1$ and so the total magnetic field as detected by receiver R is complex.

The complex magnetic field detected by receiver R may be separated into two components: a real component, $I_R$, which is in-phase with the transmitter current, $I_T$, and an imaginary (or quadrature) component, $I_1$, which is phase-shifted by 90°. The values of the real component, $I_R$, and the quadrature component, $I_1$, of the magnetic field at a given frequency and geometrical configuration uniquely specify the electrical resistivity of a homogeneous formation pierced by the drill holes. In an inhomogeneous geological formation, however, the complex field is measured at a succession of points along the longitudinal axis of the receiver borehole for each of a succession of transmitter locations. The multiplicity of measurements thus obtained can then be used to determine the inhomogeneous resistivity between the holes.

In both cases, i.e., measuring homogeneous geological formation resistivity or measuring inhomogeneous geological formation resistivity, the measurements are typically made before extraction of hydrocarbons takes place. This is because the boreholes typically are cased with conductive liners (e.g., metallic casing; see 16a and 16b in FIG. 1) in order to preserve the physical integrity of the borehole during hydrocarbon extraction. The conductive tubular liners interfere with resistivity measurements and are difficult and costly to remove from the borehole once they are installed. As a result, prior art systems such as that shown in FIG. 1 are not suitable for analyzing hydrocarbon reservoirs once extraction of the hydrocarbons begins.

The problems presented by conductive liners (16a and 16b in FIG. 1) are described by Augustin et al., in "A Theoretical Study of Surface-to-Borehole Electromagnetic Logging in Cased Holes," Geophysics, Vol. 54, No. 1 (1989); Uchida et al., in "Effect of a Steel Casing on Crosshole EM Measurements," SEG Annual Meeting, Texas (1991); and Wu et al., in "Influence of Steel Casing on Electromagnetic Signals," Geophysics, Vol. 59, No. 3 (1994). These prior art references show that coupling between a transmitter and a conductive liner is independent of the surrounding geological formation conductivity for a wide range of practical formation resistivities encountered in the field and that the magnetic field produced inside the conductive liner at a distance of a few meters or less from the transmitter depends only on the conductive liner properties and not on the formation properties.

The net or effective moment, $M_{eff}$, of a transmitter inside a conductive liner is dictated by the inductive coupling between the transmitter and the conductive liner. Physically, the resistivity of the conductive liner is very low and the inductance relatively high. This property results in a current of almost the same magnitude as that of the transmitter current being induced in the conductive liner. Lenz's Law predicts that the magnetic field generated by this induced current in the conductive liner will oppose the time-varying magnetic field produced by the transmitter current. Thus, the magnetic field generated by the transmitter is mostly cancelled out by the magnetic field generated by the conductive liner. As a result, the magnetic field external to the conductive liner is greatly reduced, and its magnitude is proportional to the difference in currents in the transmitter and the conductive liner. In effect, the conductive liner "shields" the transmitter from any receiver positioned outside of the conductive liner. An analogous situation is present with respect to a receiver if it is surrounded by a conductive liner, and the situation is exacerbated if both the transmitter and the receiver are surrounded by conductive liners.

To overcome the shielding problem, various techniques have been suggested. For example, U.S. Pat. No. 5,646,533, entitled "Induction Measurement in the Presence of Metallic, Magnetic Walls" and issued to Locatelli, et al., discloses a method of magnetically saturating the metallic wall to overcome this problem. Alternatively, gapped casing has been used to achieve a similar effect. Another approach is to determine the conductive liner properties (e.g., radius, thickness, conductivity, and permeability) and then compensate for the these properties. However, the correction needed to compensate for the conductive liner properties may be several orders of magnitude larger than the magnetic field sensed by the receiver outside the casing. Any inaccurate correction for the conductive liner properties would have an enormous impact on the accuracy of the "corrected field." Furthermore, conductive liners often are not homogeneous (e.g., due to variation in thickness, corrosion, or rust formation); such variations may further compromise the accuracy of the "corrected field." For this reason, the prior art correction methods are not useful in practice.

It therefore is desirable to have better methods to overcome the effects of conductive liners so that dynamic measurements of the resistivity of geological formations while hydrocarbons are being extracted from reservoirs contained in the geological formations would be possible.

SUMMARY OF INVENTION

One aspect of the invention relates to electromagnetic tomography systems for determining properties of geological formation penetrated by at least one borehole lined with a conductive casing. One embodiment of the invention comprises a transmitter disposed in the cased borehole and adapted to induce a magnetic field, a first receiver disposed in the cased borehole in close proximity to the transmitter and adapted to detect the magnetic field induced in the conductive casing, and a second receiver adapted to detect the magnetic field induced in the geological formation. Another embodiment further comprises a second transmitter disposed in close proximity to the second receiver.

Another aspect of the invention relates to methods for determining a conductive casing correction constant for use in electromagnetic induction tomography in a borehole lined with a conductive casing. One method comprises generating a magnetic field inside a representative piece of the conductive casing; determining a first magnetic field amplitude inside the representative piece of the conductive casing at a location proximate to a position of the generating a magnetic field, determining a second magnetic field amplitude outside the representative piece of the conductive casing, and deriving the conductive casing correction constant from a ratio of the first magnetic field amplitude and the second magnetic field amplitude.

Yet another aspect of the invention relates to methods for determining properties of geological formation penetrated by at least one borehole lined with a conductive casing. One method comprises generating a magnetic field inside a representative piece of the conductive casing, determining a first magnetic field amplitude inside the representative piece of the conductive casing at a location proximity to a position of the generating a magnetic field, determining a second magnetic field amplitude outside the representative piece of the conductive casing, deriving a conductive casing correction constant from a ratio of the first magnetic field amplitude and the second magnetic field amplitude, generating a magnetic field in the formation from within a first borehole; measuring a reference magnetic field amplitude inside the first borehole; measuring a formation magnetic field amplitude in the geological formation; correcting the reference magnetic field amplitude and the formation magnetic field amplitude using the conductive casing correction constant, and deriving a formation property from the corrected reference magnetic field amplitude measurement and the corrected formation magnetic field amplitude measurement.

Other aspects of the invention will become apparent from the following discussion.

DETAILED DESCRIPTION

Figure 1:
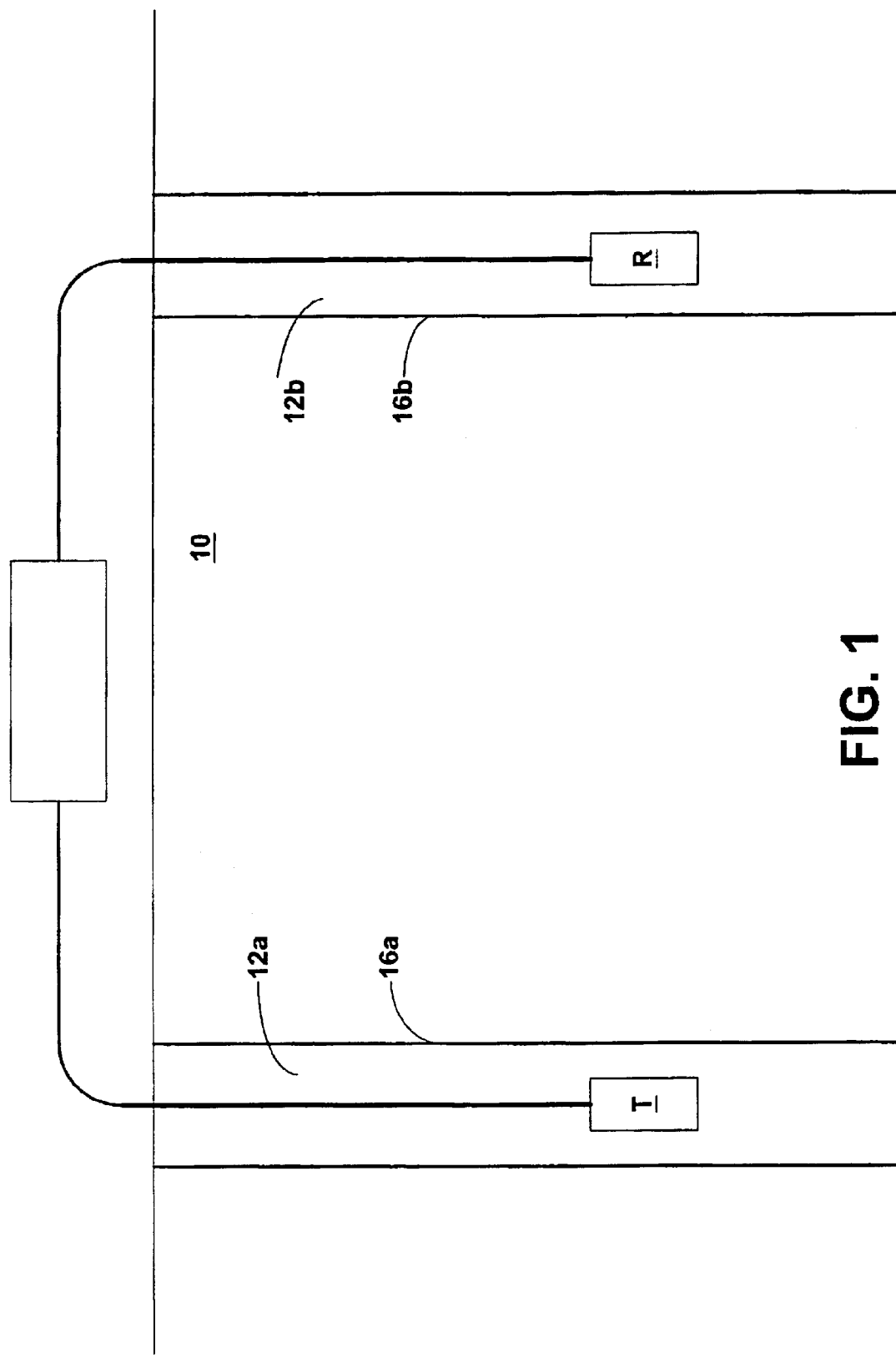
FIG. 1 is a schematic diagram illustrating a prior art cross-hole electromagnetic tomographic system.
Figure 2:
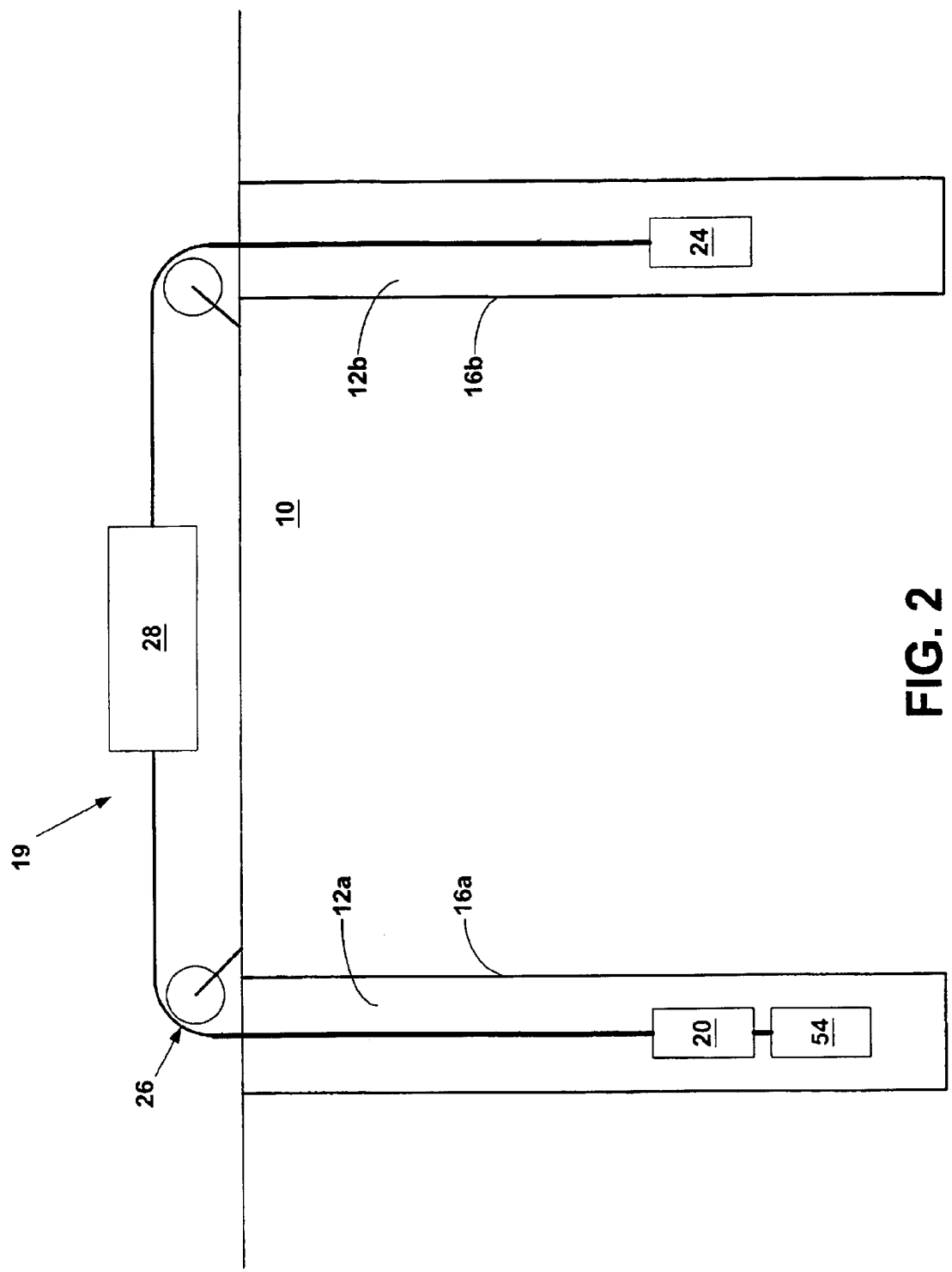
FIG. 2 is a schematic diagram of one embodiment of the electromagnetic tomography system according to the invention.

Embodiments of the present invention utilize an auxiliary receiver, an auxiliary transmitter, or both to facilitate the correction of shielding effects of conductive casings. In one embodiment, as shown in FIG. 2, system 19 employed to analyze the geological formation 10 typically includes a transmitter 20 disposed in borehole 12a and a receiver 24 disposed in borehole 12b. Alternatively, transmitter 20 and receiver 24 may be disposed in the same borehole for single borehole tomography (not shown). A transmitter typically comprises multi-turn wires wound around a magnetically permeable (e.g., mu-metal or ferrite) core and other electronic control components (e.g., a capacitor; not shown). A receiver typically comprises more than one antenna (not shown). These antennas may point to the x, y, and z directions, respectively, to detect different magnetic field components. These antennas similarly comprise multi-turn wires wound around magnetically permeable metal cores so that an external magnetic field will induce a current to flow through the wire(s). The receiver also comprises other electronic components (not shown) to detect the current (or voltage) thus induced. It will be appreciated by those skilled in the art that other types of antenna configurations may be used to implement the invention (e.g., saddle coils, segmented antennas, tri-axial antennas, etc.). Transmitter 20 and receiver 24 may be deployed using standard seven conductor wireline winches, cables, and standard seven-pin Gerhard-Owens cable connectors, shown generally as 26. System 19 is operated using a computer (not shown) included in surface station 28, which is in data communication with transmitter 20 and receiver 24.

Table 1 shows various operational parameters of a representative transmitter. Note that this is but one example; different transmitters with different physical characteristics will have different operational parameters. As shown in Table 1, this transmitter provides large magnetic moments at low (alternating current) frequencies where the inductive reactance of the transmitter is small. This reactance increases with the frequency; as a result, the magnetic moment of the transmitter decreases. That higher frequencies produce lower magnetic moments is generally true with any transmitter; this is not unique to this particular transmitter. However, higher frequencies afford better resolution of maps of geological formations. Therefore, in practice, it is often desirable to find a compromised (optimum) frequency for the analysis of a geological formation. The optimum operating frequency depends on the borehole separation and formation resistivity. Too low a frequency limits the resolution, while too high a frequency reduces the effective transmitter magnetic moment, hence the range of detection. Table 1 shows that reduction in the transmitter moment becomes more significant at frequencies of 90 Hz and above. It is apparent from Table 1 that this transmitter will provide sufficient moments at frequencies below 370 Hz. However, if conductive casings are used, it will be necessary to operate the transmitter at an even lower frequency because conductive casings act as low-pass filters.

As discussed above, a receiver may include multiple antennas (not shown), pointing to the x, y, and z directions, respectively, with the z direction being along the axis of the borehole. Due to geometric constraints, the antennas in the x and y directions are not as long as that in the z direction. As a result, the z antenna is more sensitive, i.e., the field ($B_z$) sensed by the z antenna typically has lower noise than that sensed by the x or y antenna (see $B_x$ in Table 1).

TABLE 1

| | | Typical Receiver Noise | |
| --- | --- | --- | --- |
| Frequency | Max Moment | $B_z$ noise (fT) | $B_x$ noise (fT) |
| 1 | 3000 | 30 | 80 |
| 5 | 3000 | 25 | 60 |
| 10 | 3000 | 15 | 50 |
| 24 | 3000 | 12 | 50 |
| 45 | 2800 | 8 | 25 |
| 90 | 2100 | 5 | 18 |
| 190 | 1600 | 3 | 15 |
| 370 | 900 | 3 | 15 |
| 759 | 300 | 6 | 15 |
| 1848 | 180 | 9 | 15 |

The range of operation for an electromagnetic tomography system (e.g., system 19 in FIG. 2) and the operating procedures are somewhat dependent on the formation resistivity and the presence (or absence) of conductive well casing (16a and 16b in FIG. 2.) Using transmitters and receivers commonly available in the art, a typical system may have a maximum range of about one kilometer in fiberglass cased wells or open holes (i.e., in the absence of conductive casing). This range is reduced to approximately 400 meters if one of the wellbores is cased with conductive materials. Assuming a maximum tool separation of approximately 1 kilometer, the borehole separation should probably be no more than 650 meters so that transmitter 20 and receiver 24 will remain within the maximum separation of 1 kilometers when they travel up and down the boreholes.

Before commencing analysis of geological formations, a desired frequency of operation should be selected. Because higher frequencies produce better resolution in the images of the formations, the desired operating frequency typically would be the highest frequency with which reliable data may be collected over the entire profile length (the axial length of the borehole). This frequency may be established based on two simple relations: the primary field relation and the skin depth equation.

The primary magnetic field is the field present in the absence of a geological formation for the vertical magnetic field ($B_z$). This is given by the simple expression provided below. This equation is applicable when transmitter 20 and receiver 24 are positioned at the same vertical level, but it may be used as a rough estimate when vertical levels of transmitter 20 and receiver 24 differ somewhat. The primary field relation is defined as follows:

$$B_z = \frac{100 \, M}{R^3} \qquad (7)$$

where M is the transmitter moment in $A.m^2$, R is the separation between the boreholes in meters, and $B_z$ is the vertical (z direction) magnetic field in nano Teslas (nT, $10^{-9}$T).

The skin depth ($\delta$) is defined as the distance through which an electromagnetic plane wave of frequency f propagates before attenuation to $1/e$ (0.37) of its initial amplitude. At two skin depths, the attenuation is $1/e^2$ (0.135), and at four skin depths, it is $1/e^4$ (0.018). While this relationship is not strictly applicable at locations close to the transmitter, it is an approximate measure of how much of a supplied primary field is converted into the induced currents, which in turn produce the secondary fields required for electromagnetic imaging. The skin depth ($\delta$) is a function of the formation resistivity $\rho$ and the electromagnetic wave frequency f. Thus, skin depth $\delta$ may be defined approximately as follows:

$$\delta \approx 500 \sqrt{\frac{\rho}{f}} \qquad (8)$$

where $\rho$ is the resistivity (in Ohm.m) of the formation.

From equations (7) and (8) and the source moment, the approximate field level at any cross-hole distance can be estimated. For example, assuming a separation of 200 m between boreholes and a transmitter magnetic moment of 1000, the maximum primary field, when transmitter 20 and receiver 24 are at the same vertical level, from Equation 7 is 0.0125 nT. This is well above the receiver noise for any frequency of operation (see Table 1).

During operation, transmitter 20 and receiver 24 are positioned at various vertical levels above, within, and below the area of interest. Thus, transmitter 20 and receiver 24 will typically be separated by a distance more than that between the boreholes. For a borehole separation of 200 meters, transmitter 20 and receiver 24 might be separated up to 400 meters during operation. At a diagonal separation of 400 meters between transmitter 20 and receiver 24, equation (7) shows that the primary field would be reduced to approximately 0.0016 nT, which is still above the receiver noise for any frequency of operation (see Table 1).

Equation (8) indicates that at a transmitter frequency of 200 Hz and a formation resistivity of 8 Ohm.m, the skin depth of the transmitter moment is about 100 meters $$\left( \delta = 500 \sqrt{\frac{8}{200}} = 100 \right).$$

Therefore, the borehole separation (200 m) in the above example is about twice the skin depth, and so the field (0.0125 nT as calculated above) would be further attenuated by the formation by a factor of 0.135 to 0.0017 nT, when transmitter 20 and receiver 24 are at the same level. If transmitter 20 and the receiver 24 are not at the same level, the field would be further attenuated by the increased separation between them; for example, by a factor of 0.018 when transmitter 20 and receiver 24 have a diagonal separation of 400 m (four times the skin depth). Thus, at a diagonal separation of 400 m, the field strength will be about $2.8 \times 10^{-5}$ nT or 28 fT (0.0016 nT$\times$0.018=$2.8 \times 10^{-5}$ nT), which is only a few times the noise level at 200 Hz (about 3 fT, see Table 1). This calculation indicates that a diagonal separation of about 400 m between transmitter 20 and receiver 24 may be approaching the maximum range under the circumstances (i.e., 200 Hz transmitter frequency and 8 Ohm.m formation resistivity).

As a general rule, an operating frequency is chosen by using the skin depth relation defined by equation (8) such that it will produce a skin depth about half the distance between the boreholes. In other words, the separation between the boreholes should generally be twice the skin depths. This is shown quantitatively as follows:

Separation, $$R, = 2\delta = 1000 \sqrt{\frac{\rho}{f}} \qquad (9)$$

So, $$f = 10^6 \frac{\rho}{R^2} \qquad (10)$$

where R is the separation between the boreholes in meters and $\rho$ is the formation resistivity in Ohm.m. Once a frequency is selected by using equation (10), the magnetic moment for the transmitter will be known. With the magnetic moment, the magnetic field level can then be estimated using equation (7). This magnetic field will be multiplied by the attenuation factor as described above to estimate the minimum field for the farthest diagonal separation between the receiver and the transmitter. If the minimum field.is above the system noise level (e.g., those shown in Table 1), then the frequency is suitable. If the minimum signal level falls below the system noise level, the operating frequency should be reduced. It is preferred to reduce the frequency than to collect incomplete data profiles.

If one of the boreholes (e.g., 12a) is cased with a conductive liner (e.g., 16a; see FIG. 3), calculations should include casing attenuation effects because a conductive liner effectively "shields" a transmitter from a receiver. Table 2 provides estimates of the signal attenuation due to a "typical" oil field conductive liner (e.g., steel casing). To use this table, multiply the expected field by the corresponding coefficient given in the table. Using the example discussed above, it is found that the liner attenuation at 190 Hz is 0.005, and about 0.004 at 200 Hz. The minimum expected vertical magnetic field ($B_z$) from the above example (at 200 Hz), therefore, can be determined using the equation: $B_z \approx 0.0016 \times 0.004 \approx 6.4 \times 10^{-6}$ nT (or 6.4 fT). Note that this value is approaching the noise level listed in Table 1, and it would be preferred to decrease the operating frequency to a lower frequency (e.g., 90 Hz).

TABLE 2

| Frequency | Attenuation |
|---|---|
| 1 | 1.0 |
| 5 | .9 |
| 10 | .6 |
| 24 | .3 |
| 45 | .1 |
| 90 | .08 |
| 190 | .005 |
| 370 | .001 |
| 759 | .00001 |
| 1848 | .0000001 |

In addition to general attenuation, the conductive casings present further problems because they are often not perfectly homogenous. As discussed above, such inhomogeneity renders the prior art correction methods impractical. One embodiment of the present invention permits correction of these casing effects by the presence of an auxiliary receiver 54 in the proximity of transmitter 20 (see FIG. 2). In this embodiment, the presence of auxiliary receiver 54 permits detection of a magnetic field that is solely dependent on the casing properties, but not on the formation properties. This magnetic field can then be used to correct casing effects in the magnetic field that is sensed by receiver 24. Specifically, a magnetic field $B_a$ is induced in the auxiliary receiver 54. The magnetic field $B_a$ proportional to the effective magnetic moment, $M_{eff}$, of transmitter 20 and can be expressed as follows:

$$B_a = K_T M_{eff} \quad (11)$$

where $K_T$ is a function of the separation between auxiliary receiver 54 and transmitter 20, as well as the properties of conductive liner 16a. Because auxiliary receiver 54 is inside liner 16a and in close proximity (e.g., $\leq 0.5$ m) to transmitter T, the field $B_a$ sensed by auxiliary receiver 54 is dominated by the properties of the conductive liner 16a, whereas the influence from the formation properties is negligible. Close proximity refers to a distance within which the magnetic field sensed by auxiliary receiver 54 is influenced only by the conductive casing, but not by the formation. This distance is typically less than a few meters from transmitter 20. In contrast, if auxiliary receiver 54 is far away (e.g., $\geq 10$ m) from transmitter 20, the magnetic field sensed by auxiliary receiver 54 will also depend on the formation properties.

Auxiliary receiver 54 is preferably placed in close proximity to transmitter 20, for example less than 0.5 meter. In this case, $K_T$ is not a function of the formation properties. With a fixed separation between auxiliary receiver 54 and transmitter 20, $K_T$ becomes a function of only the conductive liner properties (e.g., radius, thickness, conductivity, and permeability). The factor $K_T$ could presumably be calculated given the properties of conductive liner 16a and the dimensions and properties of transmitter 20. It is preferred, however, to experimentally determine $K_T$ by placing transmitter 20 inside a representative piece of a conductive liner and determining $M_{eff}$ by measuring the magnetic field, B, outside the conductive casing, in free space, at a distance of a few meters. In this case, the medium outside the casing is air, which has essentially zero conductivity. The field measured by the outside receiver will be that from the transmitter attenuated by the conductive casing, with no contribution from the outside medium. It should be noted that $K_T$ need not be accurately determined, nor need it reflect variations in the properties of an inhomogeneous liner. That $K_T$ need not be accurately determined will become apparent from later discussion. Once $K_T$ is determined, the effects of the properties of conductive liner 16a may be compensated for when sensing a magnetic field with a receiver disposed far ($\geq 10$ m) away from transmitter 20. Note that this receiver could be a receiver (not shown) disposed in the same borehole 12a or a receiver (e.g., receiver 24) disposed in borehole 12b. In other words, embodiments of the invention are applicable in either single borehole or cross-borehole tomography.

The following discussion assumes application of the invention in cross-borehole tomography; this discussion is equally applicable to single-hole applications. The magnetic field $B_r$ sensed by receiver 24 in borehole 12b is a function of both the effective moment, $M_{eff}$, and the geological formation resistivity as follows:

$$B_r = k_f M_{eff} \quad (12)$$

where $k_f$ is a function of both the conductive liner properties and the formation resistivity. This is in contrast to $K_T$, which describes the magnetic field $B_a$ sensed by auxiliary receiver 54 and is a function of conductive liner properties only (i.e., $K_T$ is independent of formation resistivity).

From equation (12), the factor $k_f$ may be derived as follows:

$$k_f = \frac{B_r}{M_{eff}} = K_T \frac{B_r}{B_a} \quad (13)$$

or $$\frac{k_f}{K_T} = \frac{B_r}{B_a} \quad (14)$$

where the value of the effective magnetic moment, $M_{eff}$, is substituted from equation (10). It is apparent from equation (14) that contribution of conductive liner properties will cancel out in the ratio $$\frac{k_f}{K_T} \text{ or } \frac{B_r}{B_a},$$

leaving only the contribution of formation resistivity. This is true even if the conductive liner is not perfectly homogeneous. In other words, any changes in the casing properties while transmitter 20 or receiver 24 travel up and down the borehole (e.g., due to inhomogeneous casing) will show up in both $B_r$ and $B_a$ and be cancelled out in the ratio $$\frac{B_r}{B_a}.$$

Thus, by providing auxiliary receiver 54 in the same borehole in close proximity to transmitter 20, the present invention provides a convenient way to cancel out changes in casing properties using the measurement of $B_a$ from auxiliary receiver 54 and equation (13). Furthermore, because of such cancellation, the value of $K_T$, as pointed out earlier, need only be known approximately from calculations or measurements on a representative segment of casing.

In addition to frequency, other important survey parameters include the length of the data profiles and the spacing between receiver points. These parameters determine the duration of the field survey as well as the resolution of the images. Ideally, individual data profiles should be twice as long as the borehole separation and the spacing between receiver data points should be about five percent (5%) of the well separation. For example, were the boreholes spaced 200 meters apart, the profiles should be 400 meters long (along the axial length of the borehole) with a receiver 24 spaced every 10 meters in each of the boreholes. Note that data are collected continuously as the transmitter moves in one of the boreholes, so the physical spacing between transmitter readings is much closer than spacing between the transmitter 20 and receiver 24.

Sometimes the imaging target lies within a restricted depth interval. For example, a particular oil sand undergoing water flooding. In this case the tomography can be substantially focused on this interval and the profile length reduced. It is recommended that a profile length equal to the distance between wells and a receiver spacing of five percent (5%) of the borehole spacing in the region of interest, but ten (10%) above or below these depths. The resulting image will provide good detail in the region of interest but less above or below.

Additionally, there are often physical restrictions on a survey. For example, imaging boreholes are frequently completed to the depth of the primary hydrocarbon bearing zone. It is useful, however, to extend the measurements to below this interval, but this is not possible if existing wells are utilized. The output of images taken under these less than ideal conditions is not always predictable. Usually the resolution is somewhat reduced as compared to full coverage data, but often the data are sufficient for resolving large scale structures. In addition, these data are often still quite valuable for process monitoring applications, such as in water or steam floods.

During operation, receiver 24 is positioned at various fixed depths within the borehole 12b, while transmitter 20 is pulled up continuously at a constant rate, vice versa. Therefore, for every position of receiver 24, there are measurements made at a plurality of positions of transmitter 20, defining a run of data. A plurality of runs of data is taken, with receiver 24 positions at different depths for each run. In this manner, one complete set of tomography data within the depth range of interest is achieved. Usually, the intervals between different positions of receiver 24 is about 5% of the distance between the boreholes. Receiver 24 may be first moved by twice this interval at a plurality of positions. After the desired region has been measured, receiver 24 is moved back to acquire the data at points equal-distance from adjacent positions of the aforementioned plurality of positions.

During data acquisition, procedures should be undertaken to ensure high quality measurements. To that end, initial tests may include the magnetic fields generated and sensed by system 19 with both transmitter 20 and receiver 24 suspended in ambient above the boreholes. This facilitates determining the primary magnetic field without the effect of the earth.

In addition, a linearity test may be conducted after transmitter 20 and receiver 24 have been lowered in their respective borehole. A measurement at the standard operating voltage is made, followed by a second measurement at a lower voltage. The ratio of the resultant magnetic fields to the transmitter flux should be within about ten percent for each voltage level. If the ratios differ by more than 30 percent, there is probably a system ground loop. This may be related to the grounding of the logging cable and can often be repaired.

After passing the linearity and primary field tests, normal logging operations may commence. It is preferred that the initial two logging runs be reserved for a repeatability test. These back-to-back logs should agree to within about one percent in amplitude and about one degree in phase for logging to proceed. "Warm" transmitter 20 and receiver 24 response should be within the one percent tolerance. Tests may also be performed during logging.

Tests may also be conducted on the measurements after the data collection is complete. One such test is referred to as a profile tie in which transmitter 20 is maintained at a fixed position near the top of the profile and sequentially moves receiver 24 to all of the depths it previously occupied during the analysis. A careful measurement is made at each depth of receiver 24. This procedure is then repeated for a second position of transmitter 20 within the borehole. The measurements made during the profile tie are used to tie the individual profiles together.

An additional test conducted on the measurements is referred to as a reciprocity test. It is preferred to perform a reciprocity test when the logging data repeats well, but does not fit to a layered model or follows the usual appearance of profile data. This reciprocity test involves exchanging the positions of transmitter 20 and receiver 24. It is preferred to measure reciprocity by establishing at least three positions at known depths, in the boreholes: shallow, intermediate and deep. Measurements are then made with transmitter 20 and receiver 24 in each position in each borehole. This involves measuring the data in the present logging position and then interchanging the transmitter 20 and the receiver 24 and making the measurements a second time. These measurements serve to test the depth control of system 19, as well as the stability and linearity of the signals propagating between transmitter 20 and receiver 24.

Although the foregoing has been described with only borehole 12a being lined with a conductive liner 16a, in practice either borehole 12a or 12b, or both may be lined. An analogous technique may be employed to determine the reduction in the magnetic field sensed by receiver 24 by conductive liner 16b. As before, the incident magnetic field induces a current in conductive liner 16b, which acts according to Lenz's law to reduce the magnetic field inside the borehole 12b. That is, conductive liner 16b shields receiver 24 from the incident magnetic field in a way similar to how conductive liner 16a shields and attenuates the magnetic field generated by transmitter 20.

Figure 3:
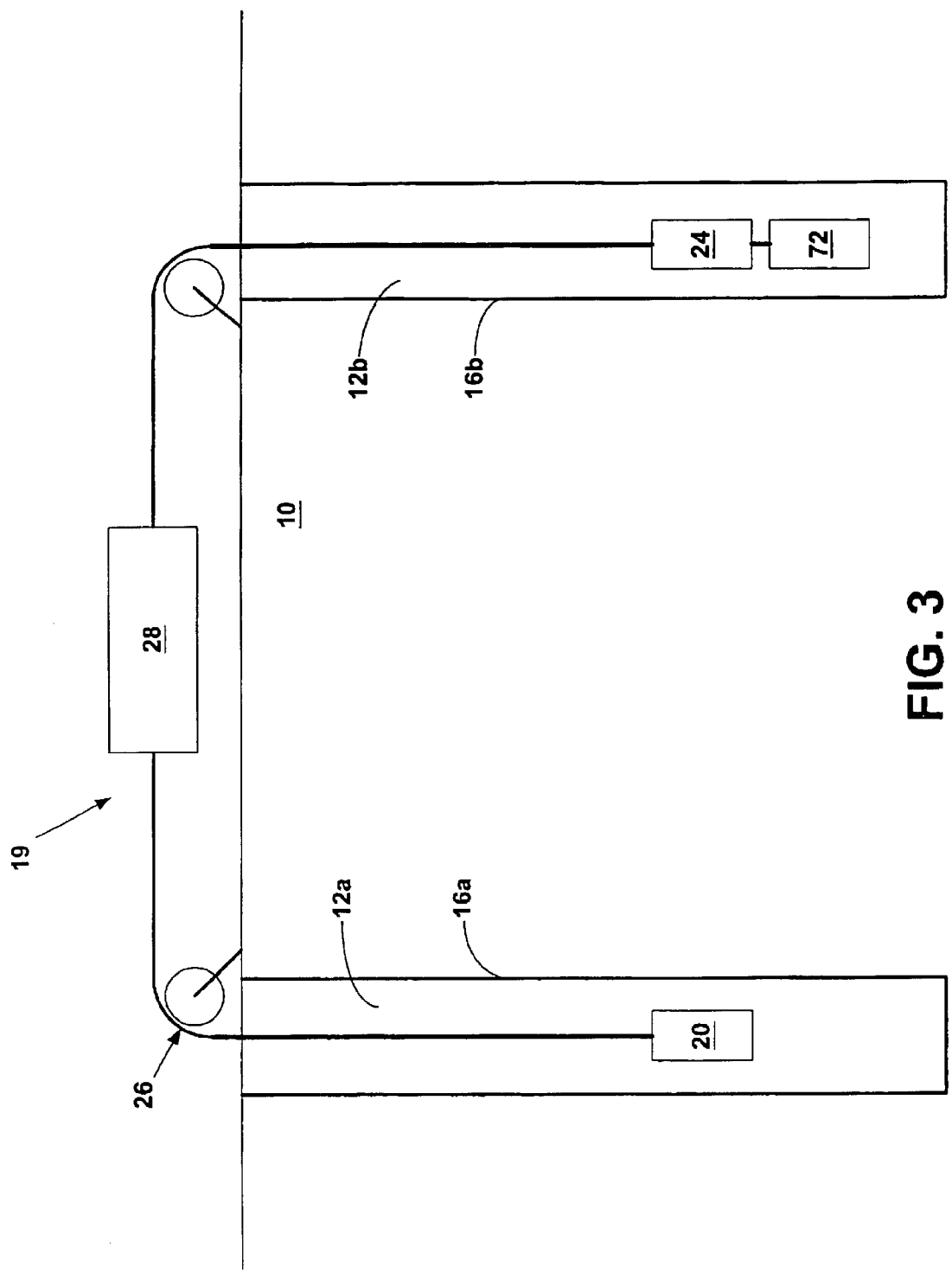
FIG. 3 is a schematic diagram of another embodiment of the electromagnetic tomography system according to the invention.

The effects of conductive liner 16b may be determined by the presence of an auxiliary transmitter 72 in close proximity to receiver 24, as shown in another embodiment of the present invention (see FIG. 3). The magnetic field generated by transmitter 72 is reduced by a factor $k_{RC}$ when it is detected by receiver 24, where $k_{RC}$ depends on the properties of the conductive liner 16b. Similarly, an external field, $B_0$, will be reduced by some factor $k_R$ when detected by receiver 24, where $k_R$ depends on both the properties of conductive liner 16b and the properties of the formation. Thus, this constant may be rewritten as $k_R=\beta k_{RC}$, where $\beta$ is a constant that is independent of the properties of the conductive liner 16b.

Because auxiliary transmitter 72 uses an active source to generate an easily measurable field for determining $k_{RC}$, it should be operated at a frequency ($f_0+\Delta f$) slightly different from that ($f_0$) of transmitter 20. However, $k_{RC}$ is frequency dependent. Therefore, $k_{RC}$ determined at frequency $f_0+\Delta f$ should be extrapolated back to frequency $f_0$. In practical implementation, $k_{RC}$ are determined at two frequencies each on either side of $f_0$ (i.e., $f_0+\Delta f$ and $f_0-\Delta f$). Then, linear interpolation of these two measurements are performed to arrive at an accurate measure of $k_{RC}$ at $f_0$.

As in the case of transmitter 20, calibration for the system may be achieved by placing receiver 24 and auxiliary transmitter 72 inside a representative piece of a conductive liner located in free space and subjecting it to a known magnetic field at a known distance. At the same time the magnetic field is measured to derive at constant $k_R$. A similar determination is made with a field generated by auxiliary transmitter 72. This measurement would establish the value of $k_{RC}$. With $k_R$ and $k_{RC}$ known, the correction factor for the conductive liner can be then determined.

Figure 4:
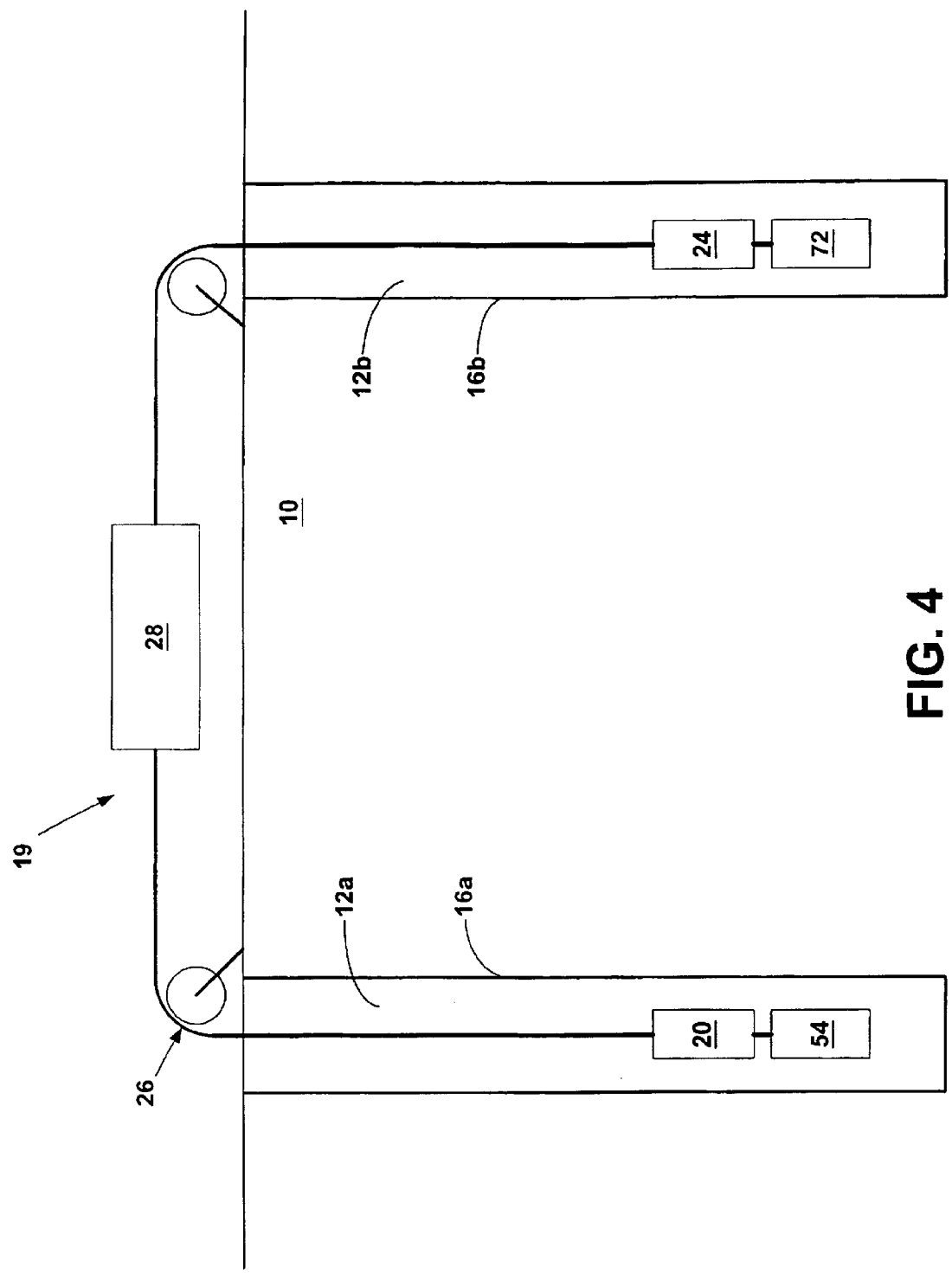
FIG. 4 is a schematic diagram of another embodiment of the electromagnetic tomography system according to the invention.

While the embodiments shown in FIG. 2 and FIG. 3 are for single-hole cased applications, the embodiment illustrated in FIG. 4 can be used when both boreholes are cased with conductive materials. In this embodiment, system 19 includes both an auxiliary receiver 54 and an auxiliary transmitter 72 (see FIG. 4). Thus, auxiliary receiver 54 can be used to correct the effects of the inductive liner 16a, while auxiliary transmitter 72 can be used to correct the effects of the inductive liner 16b. The procedures for performing such corrections are the same as described above.

The magnetic field data obtained from the tomography are used in electromagnetic (EM) modeling to derive the resistivity distribution between the boreholes. EM modeling may employ approximate methods for forward solutions or use a least square inversion technique to fit the data. These techniques are well known in the art, and any such technique may be used. In this process, it may be more convenient to assume a cylindrical symmetry and Born approximation (low contrast scattering). Alternatively, a two-dimensional rectangular geometry may be assumed and more general low scattering assumption may be included. In one method, a three-dimensional EM modeling is used, though this approach requires more computer resources.

While the invention has been described using a limited number of embodiments, those skilled in the art, having the benefit of this disclosure, will appreciate that other variations are possible without departing from the scope of the invention as disclosed herein. Accordingly, the scope of the invention should be limited only by the attached claims.

What is claimed is:

1. A method for determining a conductive tubular correction constant for use in electromagnetic induction tomography in a borehole lined with a conductive tubular, comprising:
   generating a magnetic field inside a representative piece of the conductive tubular;
   determining a first magnetic field amplitude inside the representative piece of the conductive tubular at a location proximate to a position of the generating the magnetic field;
   determining a second magnetic field amplitude outside the representative piece of the conductive tubular; and
   deriving the conductive tubular correction constant from a ratio of the first magnetic field amplitude and the second magnetic field amplitude.

2. The method of claim 1, wherein the representative piece of the conductive tubular is disposed in a medium having substantially zero conductivity.

3. A method for determining a conductive tubular correction constant for use in electromagnetic induction tomography in a borehole lined with a conductive tubular, comprising:
   generating a first magnetic field inside a representative piece of the conductive tubular;
   determining an amplitude of a first magnetic field inside the representative piece of the conductive tubular at a location proximate to a position of the generating the first magnetic field;
   determining an amplitude of a second magnetic field inside the representative piece of the conductive tubular, the second magnetic field being generated outside the representative piece of the conductive tubular; and
deriving the conductive tubular correction constant from a ratio of the first magnetic field amplitude and the second magnetic field amplitude.

4. The method of claim 3, wherein the representative piece of the conductive tubular is disposed in a medium having substantially zero conductivity.

5. A method for determining properties of a geological formation penetrated by at least one borehole lined with a conductive tubular, comprising:
   generating a magnetic field inside a representative piece of the conductive tubular;
   determining a first magnetic field amplitude inside the representative piece of the conductive tubular at a location proximate to a position of the generating the magnetic field inside the representative piece of the conductive tubular;
   determining a second magnetic field amplitude outside the representative piece of the conductive tubular;
   deriving a conductive tubular correction constant from a ratio of the first magnetic field amplitude and the second magnetic field amplitude;
   generating a magnetic field in the geological formation from within the at least one borehole;
   measuring a reference magnetic field amplitude inside the at least one borehole;
   measuring a formation magnetic field amplitude at a distance from a position of the generating the magnetic field in the geological formation selected so that the formation magnetic field amplitude is related to the magnetic field strength in the geological formation;
   correcting the reference magnetic field amplitude measurement and the formation magnetic field amplitude measurement using the conductive tubular correction constant; and
   deriving a formation property from the corrected reference magnetic field amplitude measurement and the corrected formation magnetic field amplitude measurement.

6. The method of claim 5, wherein the measuring a formation magnetic field amplitude comprises measuring inside the at least one borehole.

7. The method of claim 5, wherein the selected distance is at least 10 meters.

8. The method of claim 5, wherein the measuring a formation magnetic field amplitude in the geological formation comprises measuring from a second borehole.

9. The method of claim 8, further comprising repeating the measuring a formation magnetic field amplitude at a plurality of axial positions along the second borehole.

10. The method of claim 5, further comprising repeating the generating a magnetic field in the formation at a plurality of axial positions along the at least one borehole.

11. The method of claim 5, wherein the deriving a formation property comprises at least one of least square inversion and three-dimensional electromagnetic modeling.

12. The method of claim 5, wherein the formation property comprises resistivity.

13. The method of claim 5, wherein the generating a magnetic field comprises generating an alternating magnetic field at a selected frequency.

14. The method of claim 13, wherein the selected frequency is optimized based on geological formation resistivity and a separation between a position of the generating the magnetic field in the geological formation and a position of the measuring the formation magnetic field amplitude.

* * * * *